(12) United States Patent
Peters et al.

(10) Patent No.: US 6,335,045 B1
(45) Date of Patent: Jan. 1, 2002

(54) CONCENTRATION OF LIQUID PRODUCTS

(75) Inventors: Lars Valentin Peters, Charlottenlund; Ole Teglhus Kragh, Hornbaek, both of (DK)

(73) Assignee: APV Anhydro A/S, Soborg (DK)

( * ) Notice: Subject to any disclaimer, the term of this patent is extended or adjusted under 35 U.S.C. 154(b) by 0 days.

(21) Appl. No.: 09/584,118

(22) Filed: May 31, 2000

(30) Foreign Application Priority Data

May 31, 1999 (DK) .......................................... 1999 00770
Oct. 13, 1999 (DK) .......................................... 1999 01458

(51) Int. Cl.$^7$ .............................................. A23C 21/00
(52) U.S. Cl. .................. 426/471; 159/45; 159/47.1; 426/491
(58) Field of Search .................. 426/465, 471, 426/491; 159/2.1, 45, 47.1

(56) References Cited

U.S. PATENT DOCUMENTS

| | | | |
|---|---|---|---|
| 3,537,860 A | 11/1970 | Moore et al. | 426/471 |
| 3,615,663 A | 10/1971 | Becker | 426/471 |
| 4,441,958 A | 4/1984 | Teucci | 159/46 |
| 4,921,717 A | 5/1990 | Ranjith | 426/492 |
| 5,006,204 A | 4/1991 | Jensen | 159/45 |
| 5,036,599 A | * 8/1991 | Thompson | 159/47.1 |
| 5,730,836 A | 3/1998 | Greig et al. | 159/47.1 |

FOREIGN PATENT DOCUMENTS

| | | |
|---|---|---|
| EP | 0141403 | 5/1985 |
| EP | 0205601 | 2/1989 |
| FR | 2535171 | 5/1984 |
| JP | 58216701 | 12/1983 |
| WO | 8603942 | 7/1986 |
| WO | 9735486 | 10/1997 |

OTHER PUBLICATIONS

XP–002129636—Database WPI.
XP–002129635—Database FSTA.
Masters, K., Spray Drying Handbook, pp. 596–597.
AN.: "Whey finishing system increases dryer capacity 50%", Food Engineering Dec. 1983, p. 99.
R. Perez et al., "Aroma recovery and sulfur dioxide preservation of orange juice", CONFRUCTA, vol. 25, No. 3/4, 1980, pp. 132–140.

* cited by examiner

Primary Examiner—George C. Yeung
(74) Attorney, Agent, or Firm—Birch, Stewart, Kolasch & Birch, LLP

(57) ABSTRACT

A method for concentration of a liquid food product, the liquid product having a dry solid content of a least 40 percent and the liquid food product comprising crystallizable components, comprising the steps of heating the liquid food product to a temperature above the crystallization temperature of the liquid food product in a first heat exchanger; transferring the heated liquid food product to a first separator; flash separating volatile components from the heated liquid food product; and obtaining a liquid concentrate of the liquid food product.

22 Claims, 3 Drawing Sheets

CONCENTRATION OF LIQUID PRODUCTS

INTRODUCTION

The present invention relates to a method for concentrating liquid products, such as whey, in particular by vacuum evaporation, as well as a method for crystallisation and drying of the concentrated product.

Furthermore, the present invention relates to a system for concentrating liquid products, and a system for converting a liquid whey product into powder of high quality, such as a free-flowing, non-caking powdery product.

BACKGROUND

Whey is the liquid by-product of cheese and casein production that remains after the selective coagulation of the casein. Whey contains all of the water-soluble constituents of the milk along with whey proteins, such a lactoglobulins, lactose and some fat.

In the present contest the term whey is used for products selected from acid whey, sweet whey, salt whey, demineralised whey, whey protein fractions, lactose, pure lactose, mother-liquor from lactose crystallisation and similar products.

Permeate is in the present context that portion of a liquid that passes through a membrane when milk or whey is pumped through utltrafiltration systems.

Depending on origin, whey contains 5.5–6.5% total solids, wherein 0.7–0.9% protein, 0.05% fat, 4.2–4.6% lactose and 0.5–1.0% ash. Correspondingly, depending upon origin, permeate contains 4.0–6.0% total solids, wherein 0.2–0.3% protein, 3.3–5.0% lactose and 0.5–0.7% ash.

Concentrated, dried whey products are used for various purposes, such as ingredient in foodstuff for human and animal consumption.

PRIOR ART

In prior art several processes are known for converting liquid products, such as whey and permeate into free-flowing, non-caking powdery products.

In these known processes the liquid product is initially concentrated as much as possible, such as in a multiple effect falling film tubular evaporator. Thereby a concentration of whey up to 50–65% of total solids (TS) can be obtained.

This liquid product with 50 to 65% total solids may then—in a process commonly carried out by industry—immediately after evaporation be cooled slowly batchwise in large tanks provided with slow moving agitators for crystallisation of lactose. After crystallisation the concentrate is spray dried to its final moisture content and cooled in a fluid bed. (Masters, Spray Drying Handbook, 4 ed. 1985, p.596)

Another similar prior art process provides multiple crystallisation stages. (Masters, Spray Drying Handbook, 4 ed. 1985, p.597, FIGS. 15,12). A first crystallisation stage is obtained in large tanks as just described above. The concentrate is then spray dried to a moisture content of about 10 to 12% and the moist powder is left on a continuous belt conveyer for final crystallisation. The product is then milled and dried to its final moisture in a fluid bed. In this way a, free flowing, non-caking powder may be obtained.

In a more recent described procedure (U.S. Pat. No. 5,006,204, Niro Atomizer) the belt is substituted by a slowly rotating disk to receive partially dried whey powder from the spray dryer and deliver it to the fluid bed while permitting time for crystallisation.

The mentioned prior art processes all have several drawbacks. First, the energy efficient multiple effect evaporation process can only be used to concentrate the whey to 50 to 65% TS while the rest of the water removal requires a less energy-efficient air dryer.

Second, the known processes put severe limits to the operator's choice process parameters: It is well known to the person skilled in the art of multiple effect evaporators, that relatively high product temperatures towards the end of the concentration process are desirable, because they effectively reduce the content of micro-organisms and reduce viscosity. However, the same relatively high product temperatures promote the formation of Maillard reaction products and causes unacceptable browning and discoloration of the final product.

It is also well known, that a solution of lactose in water is able to form a super saturated solution up till approx. 2 times its solubility. This limit is already met in prior art evaporators and attempts to produce concentrates with higher total solids by using acceptable low temperature levels will therefore unavoidably lead to formation of large amounts of lactose crystals within the evaporator. This leads to scaling and very high viscosities and unpumpable products.

Third, the prior art dictates use of belts, rotating disks or discontinuously-operating crystallisation tanks, i.e. large, space and labour requiring equipment.

EP 205 601 (APV Anhydro) describes yet another process for production of a substantially free-flowing, non-caking powdery product from whey, whereby the whey is concentrated to 75% TS in vacuum evaporators. Thereafter the concentrate is passed once through a heat exchanger for cooling and crystallisation. The whey paste, which now has a high content of alpha monohydrate lactose, is fed to a Spin Flash dryer which converts the paste into a dry non-caking powder. The Spin Flash dryer is described in e.g. EP 141403 (APV Anhydro)

It has been found, however, that the whey paste from the evaporator in this process becomes extremely high viscous and very difficult to disintegrate in the spin flash dryer at elevated temperatures. Therefore, this process only allows for relatively low drying temperatures, which makes it very energy inefficient. The process has not been implemented by the whey-processing industry.

Therefore, since long the whey and permeate industry has an unfulfilled demand for a new process for converting liquid products, such as whey and permeate into a substantially free-flowing, non-caking powdery product, and which process is more energy efficient than the prior processes implemented by industry and at the same time provides an apparatus requiring much lesser building volume than the previous apparatuses.

SUMMARY OF THE INVENTION

The present invention relates to a method for concentration of a liquid product said liquid product having a dry solid content of at least 40% and said liquid product comprising crystallizable components, comprising the steps of heating the liquid product to a temperature above the crystallisation temperature of the liquid product in a heat exchanger, transferring the heated liquid product to a separator, flash separating volatile components from said heated liquid product and obtaining a liquid concentrate of the liquid products. By the present invention it has been possible to concentrate the liquid product to a very high concentration of solids, avoiding crystallisation of the liquid product during heating and separation. By the term "crystallisation of the liquid product" is meant crystallisation of crystallizable components in the liquid product. Furthermore, by the present invention it is possible to concentrate a liquid product having a high starting content of solids, i.e. at least 40% of solids. The content of solids relates to the content of total dry solids (TS) as described below. Accordingly, the present invention offers a cost-effective method of concentrating a liquid already having a high content of solids. The method is particularly effective to apply after state of the art concentration processes described above and before drying processes.

The crystallisation temperature is depending on the concentration of solids in the liquid product. By the term "a temperature above crystallisation temperature" is meant the temperature at which substantially no crystallisation occurs when the liquid product is flowing in the concentration system, at the predetermined solid concentration of the liquid product. In particular substantially no formation of x-lactose crystals occurs when the liquid product is heated to the temperature above crystallisation temperature.

In particular the present method may be applied for concentration of liquid whey products, whey products being as defined elsewhere in the description.

In the present context the term "liquid product" is meant to define the starting material fed into the concentration system, whereas the term "liquid concentrate" is meant do define the product obtained after flash separation.

Furthermore, the invention relates to a method of converting whey into substantially free-flowing, non-caking powdery product comprising the steps of, subjecting whey to concentration as defined above obtaining a main stream of liquid whey concentrate, crystallisation of the whey concentrate and drying said crystallised whey obtaining free-flowing, non-caking powder. The powder flowability may be measured according to Cheremisinoff (see below) whereby a free-flowing powder is having an angle of repose of 30 or less. The caking properties are estimated by examining the crust formed on a spoonful of powder, subjected to 60% relative humidity at 20° C. for 24 hours. A non-caking powder does not form any crust under these conditions. A non-caking powder is more stable than caking powders.

When the concentration process is carried out according to the invention a powder having very good properties in relation to flowability and cakability is obtained.

By the term a powdery product is meant a product normally considered as powder, i.e. having a particle size corresponding to powder, such a preferably above 0.1 μm and preferably below 2 mm. The particle size is measured as the approximate diameter of the particle.

By the methods according to the invention the concentration, crystallisation and drying of liquid products may be carried out in a system which is more energy efficient and requires less building volume than prior art systems.

Accordingly, the present invention further relates to a system for concentrating liquid products, having a concentrating unit comprising means for feeding an inlet of a heat exchanger, a heat exchanger comprising at least one inlet and one outlet, connecting means for connecting the heat exchanger outlet and an inlet of a separator vessel, and a separator vessel, comprising at least one inlet and least two outlets.

Furthermore, the invention relates to a system for converting whey into a powdery product comprising means for concentration of a liquid product as defined above, means for initial crystallisation of the liquid concentrate, and means for drying said crystallised product obtaining free-flowing, non-caking powder, which means are interconnected by a main conduct.

The system provided by the present invention provides for a rapid and economic production of high quality powder from a liquid product.

DRAWINGS

DETAILED DESCRIPTION OF THE INVENTION

Figure 1:
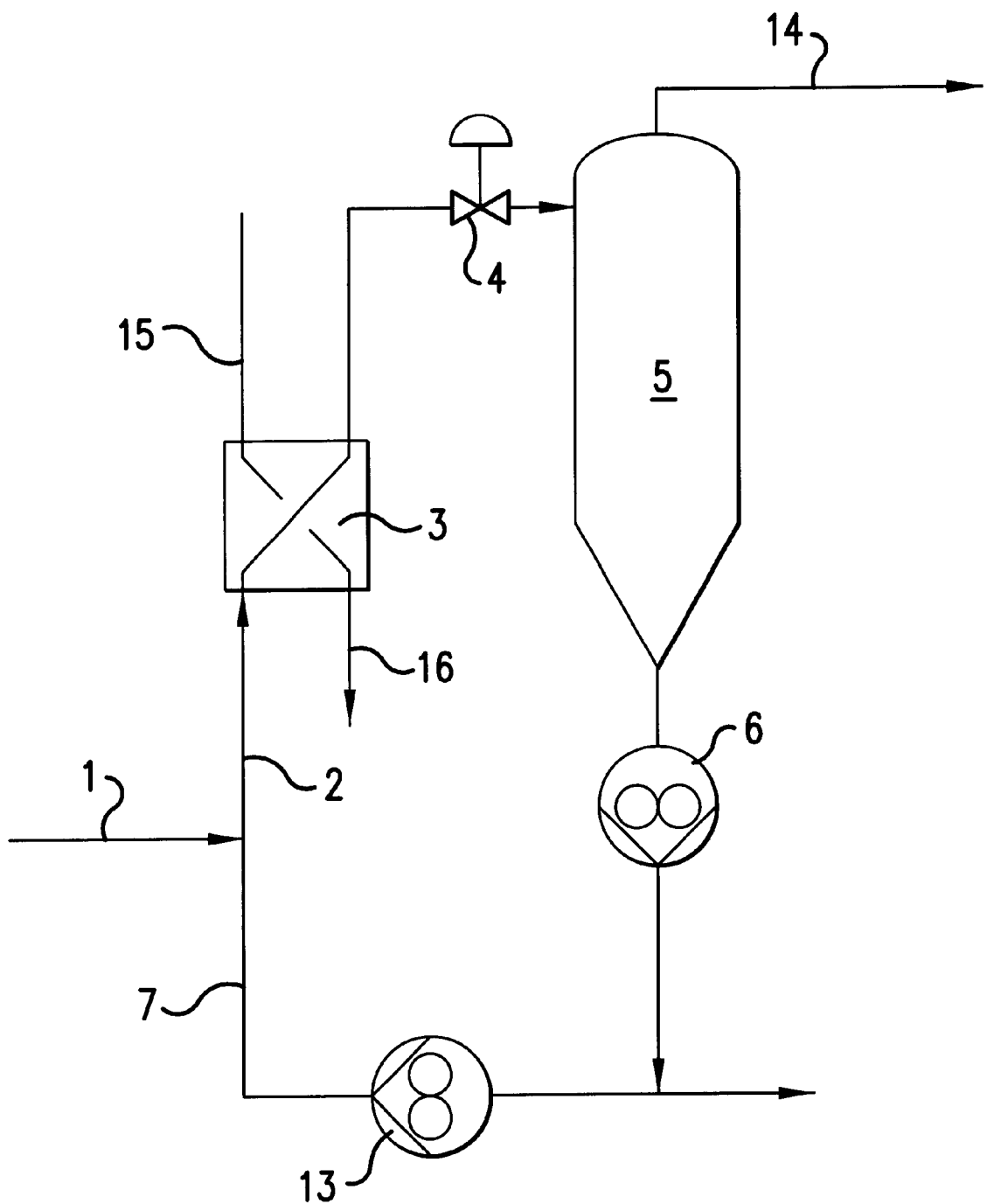
FIG. 1 is a schematic diagram of a concentration unit of a system according to the invention for carrying out the method.

In the following the method is described with respect to whey only, however it is within the scope of the present invention to include any liquid product to be concentrated, which product has to be concentrated to a high content of solid and at the same time due to the contents of the product is in risk of being deteriorated at high temperatues.

The liquid product is in particular any product comprising crystallizable components and preferably also comprising proteins, such as any products resulting from traditional cheese making and casein manufacturing, such as whey. Accordingly, the liquid product is preferably selected from acid whey, sweet whey, salt whey, demineralised whey, whey protein fractions, lactose, pure lactose, motherliquor from lactose crystallisation, or permeate from production of protein from milk or whey. The whey protein fractions may be pure whey protein fractions, or whey protein fractions further comprising starch or/and other proteins. These liquid products are used as the starting material for producing whey or permeate powder, which preferably is a free-flowing, non-caking powder.

When concentrating liquid whey products it is of importance to control the crystallisation of lactose in the liquid product. In case the lactose crystallises during the heating step the heat exchanger must be cleaned very often, if at all cleanable due to formation of lactose crystals.

As described above, according to the method of the present invention the liquid product is heated to at least the crystallisation temperature of the liquid product in a heat exchanger. By the term heat exchanger is meant any suitable heater providing a fast and even heating. Thus a heat exchanger may be any conventional heat exchanger, such as a plate heat exchanger, a "scraped-surface heat exchanger" and a tube heat exchanger. In case of a plate heat exchanger it is preferred to use a heat exchanger having a high ratio of height to width, such as a ratio from 2.5 to 3.5.

The heat exchanger may also be an electroheating means providing volumetric heating by means of direct electrical resistance heating, also called ohmic heating. Thus, the liquid whey product is preferably heated to at least 80° C. in a heat exchanger. By heating to at least 80° C., more preferred to at least 85° C., even more preferred to at least 90° the risk of crystallisation in the heat exchanger is significantly reduced.

Two undesirable chemical reactions are especially important in the industrial processing of whey and permeate—the Maillard reaction and the denaturation of protein.

The Maillard reactions are several successive reactions which occur between lactose and lysine of the proteins in the liquid product. It inactivates lysine and consequently decreases the nutritional and physiological value of proteins. It further comprises a series of degradation reactions (e.g. formation of hydroxymethylfurfural) and some very reactive cleavage products to form brown polymeric condensation products (melanoidines). It is therefore important to adapt whey-processing technology to minimise formation of Maillard reaction products. In various references the Maillard reaction has been explained as being influenced by various parameters, such as temperature, time, carbohydrate (eg lactose) and protein concentration, pH, and water content. (Reyes, F G. G. (1982) J Food Sci. 47, 1376–7.)

The risk of denaturation and Maillard-reaction is increased the longer the liquid product is heated. Therefore, it is preferred that the liquid product is heated very fast, and accordingly, the heating is preferably carried out in a plate heat exchanger wherein the contacting time of the liquid product with the plates of the heat exchanger is short. The plates of the heat exchanger are heated, for example by hot water.

Vaporisation, as a consequence of boiling of the liquid product is not allowed to take place within the heat exchanger itself. Boiling is suppressed either by a liquid static head above the heat exchanger or by a restriction in the discharge line in the form of an orifice piece or a control valve.

After being heated in the heat exchanger the liquid product is transferred to the separator vessel by means of for example a connecting line between the heat exchanger and the separator vessel, to be flash separated in the separator. The principle of flash evaporation according to this invention is well known, see e.g. Perry's Chemical Engineer Handbook, 6. Ed (1984). p. 11–35, 11–40. A flow of liquid is heated in a heat exchanger and allowed to expand into a vessel where the actual solvent (volatile components) will evaporate with a corresponding drop of temperature in the liquid phase. It is understood that the temperature rise in the heat exchanger and the temperature drop of the liquid in the flash are substantially equal.

The volatile components will be any components in the liquid product capable of evaporation at the temperature and pressure of the separator vessel. During flash separation the volatile components of the liquid products are separated from the liquid product, whereby a liquid concentrate of the liquid product is obtained. After separation the formed vapour is removed by means of a condenser or vacuum pump.

The temperature of the separator vessel is equal to or a few degrees below the temperature of the heated liquid product. Accordingly, the temperature of the liquid product in the separator vessel is preferably in the range of 65–90° C., more preferably in the range of 70–85° C.

Furthermore, the pressure in the vessel wherein the flash separation is carried out is preferably regulated to a pressure below the vapour pressure of the heated liquid product. Thus, the separation is preferably conducted under a pressure in the range of 0.4–1.2 bar. More preferred a vacuum is applied, such as 0.5–0.9 bar.

It is preferred that the liquid product comprises at least 40 percent of solid, preferably at least 50 percent of solid, more preferably at least 60 percent of solid.

The concentration method is preferably applied in the production of whey powder, whereby it is desired to obtain as large a solid concentration as possible during concentration in order to improve the later crystallisation process of the lactose in the whey. In a preferred embodiment the liquid concentrate obtained comprises at least 65 percent of solid, in a more preferred embodiment at least 70% of solid. Concentration of whey preferably leads to a solid content of about 73%, whereas concentration of whey permeate preferably leads to a solid content of about 80%.

The concentrate obtained may be transferred directly to a buffer tank for crystallisation and subsequent drying in a dryer. However, it has been found that the concentration process is further improved if it comprises recirculation of at least a part of the concentrate. The recycled concentrate is then mixed with the liquid product before being fed to the heat exchanger.

The recirculation is preferably carried out by continuous recirculation of a predetermined partial flow of the liquid concentrate to the heat exchanger. Preferably, at least 75% of the liquid concentrate is continuously recycled to be mixed with liquid product and then entered into the heat exchanger to be reheated and subjected to a further separating step. In an even more preferred embodiment at least 90% of the liquid concentrate is continuously recycled. This may be accomplished by using conduits having different diameters when transferring the liquid product and the liquid concentrate to the heat exchanger. In particular a ratio of the cross-section area of the liquid concentrate conduit to the cross-section area of the liquid product conduit is at least 10:1, such as at least 25:1, more preferred at least 30.1, yet more preferred at least 50:1.

The ratio of liquid concentrate to liquid product in the mixture feeding the heat exchanger is preferably at least 3:1, such as at least 10:1, more preferred at least 25.1, most preferred at least 50:1.

Furthermore, the high percentage of recycling also leads to a high content of solids in the mixture of recycled liquid concentrate and liquid product. The high content of solids reduces the water activity and increases the viscosity leading to a low migration velocity of molecules. Without being bound by theory, it is believed that due to a high solid content in the liquid product the lactose molecules are "masking" the protein molecules, inhibiting unfolding and denaturation of the protein.

Highly concentrated whey is very viscous, however due to the visco-elastic and thixotropic nature of whey concentrate, the circulation rate has a great influence on the viscosity of the liquid concentrate. The circulation rate is controlled to any suitable rate with respect to the apparatus in use. The rate is preferably as high as possible reducing the viscosity of the liquid concentrate. As a measure of the preferred flow rates in the separating vessel and the conduit through positive displacement pump a preferred ratio between their diameters is indicated. Preferably the diameter of the flash separating vessel is in the range of from 3 to 30 times the diameter of the conduit leading to pump, more preferably the ratio of the diameter of the separating vessel to the diameter of the conduit is in the range from 10:1 to 20:1.

Various pretreatment of the liquid product before entering the line leading to the heat exchanger may be carried out. Also, a pre-concentration step may be conducted. In particular with respect to whey a pre-concentration may be conducted whereby the solid content is increased from the starting concentration of about 6% to about 58%. The pre-concentration may be carried out by any suitable method known to the skilled person.

The method has been described with respect to one concentration unit comprising one heat exchanger and one flash separator. However, the method may also be conducted in a system comprising two or more units. Thereby, the concentration of the liquid concentrate solids is increased stepwise. For example with respect to whey, the concentration of the liquid concentrate from the first unit may be 66%, and from the second unit 73% starting with 58% in the liquid product. For each unit recirculation of the liquid concentrate within the unit may take place as described above. The method is even more energy-efficient when it is carried out stepwise.

By the present method it has become possible to concentrate liquid products, in particular liquid whey products, to a higher concentration than previously possible before crystallisation and drying.

The highly concentrated liquid concentrate will crystallise shortly after leaving the concentration unit. Accordingly, the present invention relates to a method of converting whey into substantially free-flowing, non-caking powdery products by subjecting liquid whey product to a concentration process as described above.

After concentration the liquid whey concentrate is subjected to crystallisation, whereby the whey concentrate is cooled. The crystallisation step is followed by a drying step, whereby a free-flowing, non-caking whey powder is obtained. The crystallisation may take place as an initial stage of crystallisation, whereby the whey concentrate is initially cooled, as well as a final stage of crystallisation, whereby the whey concentrate is finally cooled.

In a preferred embodiment the crystallisation step may be initiated by a cooling step, for example a flash cooling.

In yet a preferred embodiment of the invention a secondary stream is fed to the main stream of initially cooled whey concentrate. The feeding of a secondary stream to the main stream increases the concentration of total solids of the main stream compared to the concentration of total solids in the main stream after the initial cooling.

Another purpose of the feeding of the secondary stream is to feed additives to the whey. Thus, the content of the secondary stream may depend on the use of the finally obtained free-flowing, non-caking powder.

For many uses, such as fodder, it will be convenient to feed additional nutritional material to the main stream in order to obtain a free-flowing, non-caking powder suitable as fodder.

Accordingly, the secondary stream may comprise fats, proteins, carbohydrates, minerals or mixtures of these.

Examples of fats are animal or vegetable fats, such as lard, butter, butter fat, coconut oil, palm kernel oil.

Examples of proteins are animal and vegetable proteins, such as proteins from milk, such as caseins, proteins from egg, soy proteins, cereal protein, in particular wheat protein, mixtures of cereal protein.

Examples of carbohydrates are lactose, starches, flour, sugars, dextrose. Examples of minerals are salts of calcium, sodium and potassium.

Normally a mixture of the above would be used, such as skimmed milk powder, whole milk powder and whey protein concentrates. However, the secondary stream may also comprise crystallised whey.

An embodiment of the present invention is the feeding of the secondary stream by withdrawing a secondary stream of crystallized whey from the main stream of finally cooled, crystallized whey, and recycling said secondary stream of crystallized whey to be mixed with the main stream of initially cooled whey concentrate passing through the stages of crystallization.

The secondary stream may be withdrawn at any stage after the final cooling. It is preferred to withdraw the secondary stream from the main stream of finally dried free-flowing, non-caking powder.

In an embodiment of the present invention, the secondary stream is fed to an intermediary stage of crystallisation, wherein a continuous mixing operation is being performed to provide agitation and residence time, to change the properties of the product emerging from the mixing means. The mixing means may be any suitable mixer, such as a paddle mixer or an extruder.

To adjust the content of total solids in the main stream before the stage of the mixing means within a specified range, the content of total solids in the main stream after the initial cooling may be measured. An example of measurement may be withdrawal from the main stream immediately after the initial cooling stage of a sample, and obtaining a measure of the content of total solids in the sample.

The result from the measurement may be used to adjust the flow of the secondary stream to obtain the specified content of total solids before the stage of the mixing means. The adjustment of the secondary streams may be carried out manually or by an automatic process.

Another example of measurement is where a sample is withdrawn immediately before the stage of the mixing means and the other steps are performed as described above.

The flow of the secondary stream may thus be adjusted to obtain a content of total solids (TS) in the main stream before the stage of the mixing means to 80–95%, such as 80 to 90%.

In the present context, the term "TS" means total solids in a product or an intermediate as kg dry solid/kg product, as measured by weightloss in oven at 102° C., 4 hours.

Any suitable dryer may be used for drying the crystallised whey. The dryer is preferably a spin flash dryer, more preferably a spin flash dryer provided with a substantially flat bottom.

A detailed description of the system according to the invention is provided by reference to the drawings.

Turning to FIG. 1 a preferred system comprising a concentration unit for concentrating liquid products is shown. The liquid product is fed to the system via the conduit (1) to recirculation conduit (2). The recirculation conduit (2) is leading to the heat exchanger (3), wherein the liquid product is heated to a temperature above the crystallisation temperature of the liquid product. The heat exchanger (3) is preferably a plate heat exchanger. The heat exchanger (3) is heated by steam or hot water that is led to the heat exchanger (3) through conduit (15) and out through conduit (16). Boiling in the heat exchanger is suppressed by a control valve (4). When using a plate heat exchanger it is preferred to use a tall heat exchanger, wherein the ratio between the height to the width is in the range from 2.5 to 3.5.

The liquid product is transferred in the conduit to the separator vessel (5). Flash separation is carried out in the separating vessel (5), whereby the vapour is removed by conduit (14) and the liquid concentrate obtained is removed by a conduit through positive displacement pump (6). As a measure of the preferred flow rates in the separating vessel (5) and the conduit through positive displacement pump (6) a preferred ratio between their diameters is indicated. Preferably the diameter of the flash separating vessel (5) is in the range of from 3 to 30 times the diameter of the conduit leading to pump (6), more preferably the ratio of the diameter of the separating vessel to the diameter of the conduit is in the range form 10:1 to 20:1.

The capacity of the pump is preferably regulated by the drop of pressure between the flash separating vessel (5) and the pump (6).

In the preferred embodiment the liquid concentrate obtained is divided into a main stream flowing in conduit (8) and a recirculation stream flowing in conduit (7) conduit through positive displacement pump (13). The recirculation stream in conduit (7) is mixed with liquid product from conduit (1) and recycled to the heat exchanger (3) through conduit (2).

The ratio of the cross-section area of conduit (7) to conduit (1) is preferably at least 10:1, such as at least 25:1, more preferred at least 30:1, yet more preferred at least 50:1.

As may be understood from the above the invention also encompasses a system comprising at least two concentration units, said the units being serially connected whereby a stepwise concentration process is conducted. Thus, in one embodiment of the present invention the system comprises two concentration units whereby the stream flowing in conduit (8) of the first concentration unit becomes feeding stream of conduit (1) of the second concentration unit.

Figure 2:
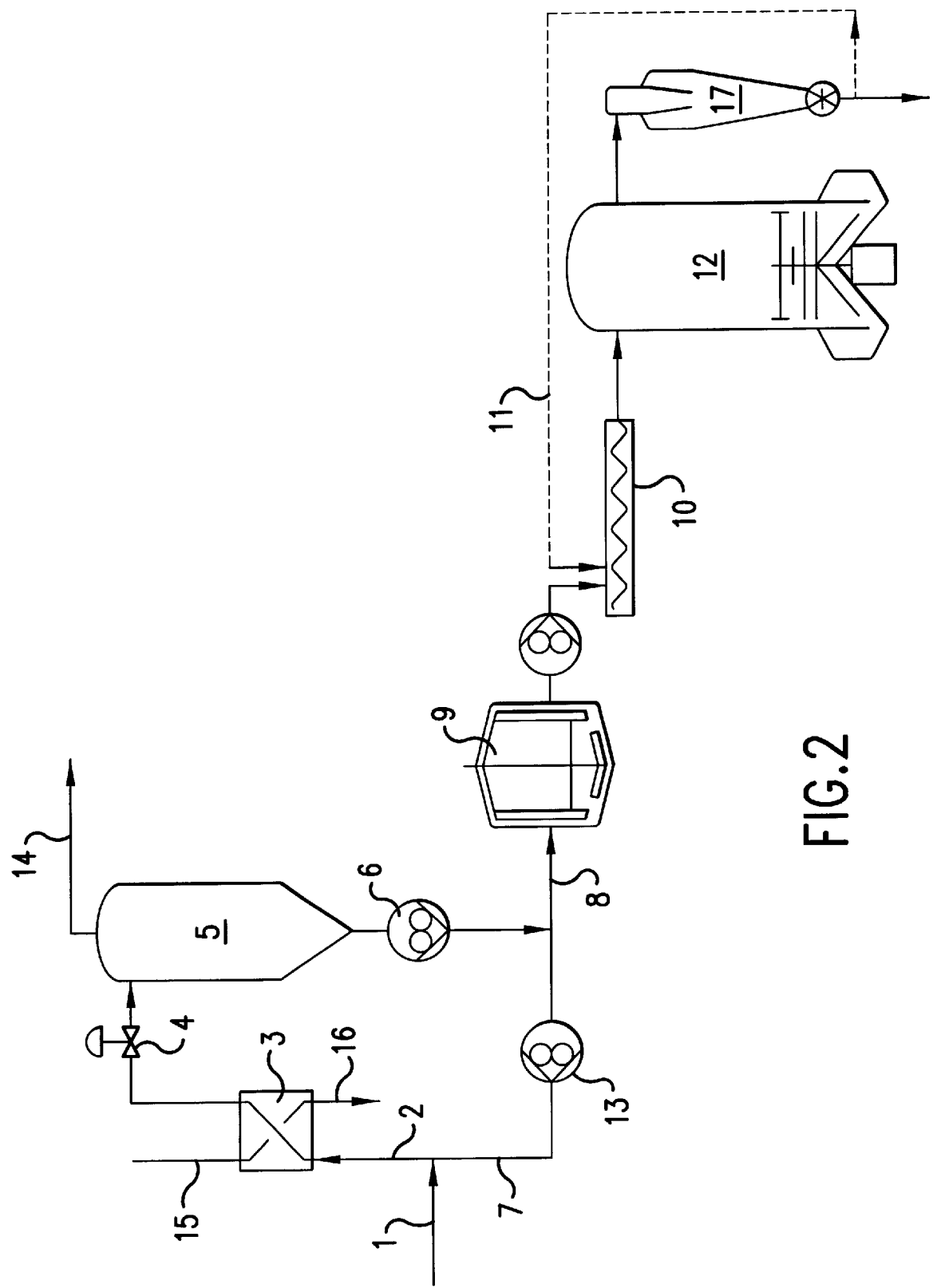
FIG. 2 shows the unit of FIG. 1 connected to a crystallisation and drying unit according to the invention.

FIG. 2 shows a system according to the invention for crystallisation and drying of the concentrate obtained by a system as depicted in FIG. 1. Conduit (8) is leading liquid concentrate to a buffer tank (9). The buffer tank (9) may be any suitable vessel wherein a first stage of crystallisation of the liquid concentrate is carried out during cooling.

The thus initially cooled and crystallised concentrate is then transferred to a feeding means (10) for a drying apparatus (12). The feeding means (10) may be any suitable feeding means for residence and transport of the concentrate. The feeding means (10) may comprise a screw and/or a conveyor belt, the latter in particular being providing for final cooling and residence time of the concentrate.

The finally cooled and crystallized concentrate is fed into a dryer (12). The dryer is preferably a spin flash dryer, such as Spin Flash™ from APV Anhydro A/S, Denmark. The dried product is then passed into a powder collector (17).

In a preferred embodiment the system comprises a secondary conduit (11) extending to the main conduit part leading to the feeding means (10). As may be seen from FIG. 2 the secondary conduit (11) may be a conduit extending in a closed loop connection from a part of the main conduit conveying finally dried product to the main conduit part leading to the feeding means (10).

Figure 3:
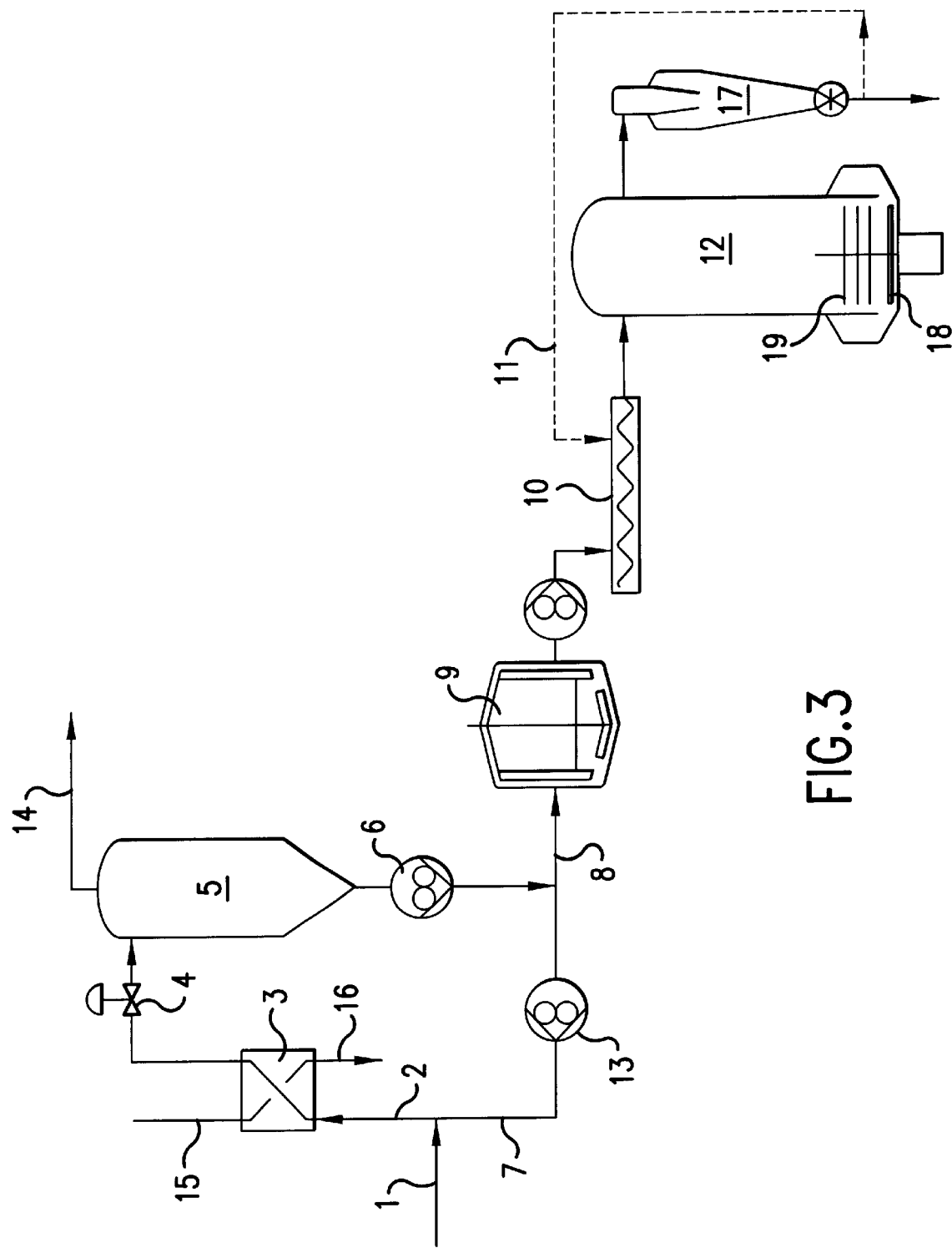
FIG. 3 shows an embodiment of the system of FIG. 2 wherein the dryer is a spin flash dryer with a flat bottom.

FIG. 3 shows a preferred embodiment of the system of FIG. 2, in that the spin flash dryer (12) is provided with a substantially flat bottom (18). Also, the scrapers (19) are preferably formed as tapered pins instead of conventional scrapers. The rate of rotation as measured at the periphery of the pin-formed scrapers is preferably from 5–25 m/s, more preferred from 8–20 m/s, and the vertical velocity of the air in the dryer shall preferably be from 2–5 m/s, such as 3–4 m/s. The dried product passes from the dryer (12) into a powder collector (17).

EXAMPLES

The invention and the advantages obtained by using this are elucidated by the results from the following Experiments 1 to 4.

Examples 1–3

The feed material for Experiment 1 and 2 was pre-treated rennet cheese whey with 6.00% total solids. The feed material for Experiment 3 was permeate from the production of milk protein by utltrafiltration of sweet whey with 5.50% total solids.

In all Experiments whey or permeate was pre-concentrated in a multistage MVR falling film evaporator with 50 mm tubes of 18 m length as described by e.g. Knipschildt in Modern Dairy Technology (Ed. Robinson) 1986, Vol 1, p. 147 ff.

Experiment 1 was performed according to prior art. (K. Masters, Spray Drying Handbook, 4 ed. 1985, p. 596). The concentrate from the falling film evaporator was flash cooled to 40 deg C. and slowly cooled during 24 hours for crystallisation of lactose. Spray drying took place in a 3-stage dryer with a chamber of a diameter of 5 m and a total height of 12 m, with internal and external fluid beds and fitted with an air broom.

Experiments 2 and 3 were performed according to the invention in a system as the one illustrated in the drawings. The concentrate from the falling film evaporator (not shown in the drawings) was fed to the recirculation line (7) of a suppressed boiling forced circulation plate evaporator (3,4, 5,6,7). After heating the separation process took place in a flash separator (a Single effect Paraflash, manufactured by APV Separation Processes). The concentrate from the exit line (8) was held in a buffer tank (9) for 15 min. It was then led to the inlet of a mixer/feeder (10) together with dry powder (backmix, (11)) and fed directly to an air dryer (12) (Spin Flash™ Dryer, manufactured by APV Anhydro).

Measurement of particle size was made by laser diffraction. The powders were distributed on a small vibrating powder-feeder, suspended in air and blown/sucked through the laser beam of a Malvern Particle Sizer Series 2600.

Particle size measurements are expressed as Rosin-Rammler-Bennett (RRB) mean diameter d' and as RRB inclination parameter. n (See e.g. DIN Standard 66145 or many text-books, including Perry's Chemical Engineers' Handbook, 6th edition (1984) p. 8-5).

Flowability of a powder was measured by pouring app. 10 grams of powder in a wide tipped funnel, resting on a table. When the funnel is removed carefully by hand, the powder will be left as a more or less cone-shaped pile. Flowability is expressed as the angle of repose, measured by means of a handheld goniometer. The normal range for spray dried powders is from 30 degrees or less ("good") to 45 degrees or more ("poor"). (Reference is made to Cheremisinoff, N., Hydrodynamics of Gas-Solids Fluidization, (1984), p. 6).

Caking properties are estimated by examining the crust formed on a spoonful powder, subjected to 60% relative humidity at 20 C. for 24 hours.

The experimental data and results are listed in the table 1 below.

TABLE 1

| Experiment | 1 | 2 | 3 |
|---|---|---|---|
| Product | spray dryer rennet cheese whey | flash evaporator/ Spin Flash dryer rennet cheese whey | flash evaporator/ Spin Flash dryer Permeate |
| Liquid product kg/h | 260 | 260 | 260 |
| Total solids in liquid product | 58 | 58 | 60 |
| Total solids in concentrate | — | 75 | 83 |
| Flow to spray dryer kg/h | 260 | — | — |
| Flow to mixing vessel kg/h | — | 200 | 180 |
| Backmix of powder kg/h | | 150 | 150 |
| Drying air temperature inlet/outlet | 175/70 | 140/50 | 140/50 |

TABLE 1-continued

| Experiment | 1 | 2 | 3 |
|---|---|---|---|
| Moisture in dry powder (Karl Fisher) | 4.1 | 4.2 | 5 |
| Degree of crystallisation | 66 | 88 | 89 |
| Bulk density untapped g/cm3 (DIN 53194) | 0.58 | 0.79 | 0.73 |
| Bulk density tapped g/cm3 | 0.69 | 0.89 | 0.82 |
| Particle size d' (RRB) mum | 98 | 350 | 100 |
| Solubility index (ADMI) | 0.1 | <0.1 | <0.1 |
| Dispersibility | 90.6 | 91.3 | 95.4 |
| Flowability (Cheremisinoff) | poor | Good | Excellent |
| Hydroxymethylfurfural mikromol/l | 8 | 8 | 6 |
| Whey protein denaturation mgN/g | 15 | 10 | 8 |
| Caking-properties | "caking" | "non-caking" | "non-caking" |
| Volume of building for equipment, index | 100 | 34 | 34 |
| Energy consumption index | 100 | 51 | 51 |
| Equipment investment, index | 100 | 74 | 74 |

From the data listed above it may be seen that whey powder obtained by the method according to the invention has better flowability characteristics, lesser denaturation, same or lesser content of hydroxymethylfurfural (Maillards reaction) than the prior art method. Furthermore, the method requires less building, energy and investment.

Example 4

Double effect concentration.

A double effect concentration process of permeate as in example 3 was conducted in a system comprising a double effect evaporator with counter current product. The experimental data and results are listed in table 2 below.

TABLE 2

| Concentration step | 2. effect | 1. effect |
|---|---|---|
| Liquid product (kg/h) | 500 | 440 |
| TS % in liquid product | 60.0 | 68.1 |
| Water evaporation (kg/h) in flash | 60 | 75 |
| Liquid concentrate (kg/h) | 440 | 365 |
| TS % in liquid concentrate | 68.1 | 82.0 |
| Temperature of heated liquid product (° C.) | 81 | 94 |
| Recycling (kg/h) | 18600 | 26900 |

As may be seen from the results specified above through a two-step concentration process 500 kg/h of a whey permeate (TS 60%) was concentrated to 365 kg/h concentrate having a dry solid content of 82%.

What is claimed is:

1. A method for concentration of a liquid food product, said liquid food product having a dry solid content of at least 40 percent and said liquid food product comprising crystallizable components, comprising the steps of
heating the liquid food product to a temperature above the crystallization temperature of the liquid food product in a first heat exchanger while suppressing boiling of the liquid food product,
transferring the heated liquid food product to a first separator,
flash separating volatile components from said heated liquid food product in said first separator, and
obtaining a liquid concentrate of the liquid products from said first separator.

2. The method according to claim 1, wherein the liquid food product is derived from cheesemaking or casein production.

3. The method according to claim 2, wherein the liquid food product is selected from the group consisting of acid whey, sweet whey, salt whey, dematerialized whey, whey protein fractions, lactose, pure lactose, motherliquor from lactose crystallization, and liquid permeate from production of protein from milk or whey.

4. The method according to claim 1, wherein the first heat exchanger is a plate heat exchanger.

5. The method according to claim 1, wherein the liquid product is heated to a temperature above 80° C.

6. The method according to claim 1, wherein the liquid food product comprises at least 50 percent of solid.

7. The method according to claim 1, wherein the product temperature in the first separator is in the range of 65–90° C.

8. The method according to claim 1, wherein the pressure in the separator is in the range of 0.4–1.2 bar.

9. The method according to claim 1, wherein the liquid concentrate comprises at least 65% of solids.

10. The method according to claim 9, wherein the liquid concentrate comprises at least 70% of solids.

11. The method according to claim 1, wherein at least 75% of the liquid concentrate obtained is mixed with said stream of liquid food product and recycled to the first heat exchanger to be reheated and subjected to said separating step.

12. The method according to claim 11, wherein at least 90% of the liquid concentrate obtained is recycled.

13. The method according to claim 11, wherein said liquid concentrate is continuously recirculated.

14. The method according to claim 1, wherein said liquid food product is pretreated prior to being heated.

15. The method according to claim 1, wherein said liquid concentrate is heated in a second heat exchanger, and transferred to a second separator whereby a liquid concentrate is obtained by flash separating.

16. The method according to claim 15, wherein at least a part of the liquid concentrate is recycled at least once before being transferred to the second heat exchanger.

17. The method according to claim 1, wherein said liquid food product comprises whey, and liquid concentrate comprises liquid whey concentrate, further comprising the steps of crystallizing and drying said whey concentrate.

18. The method according to claim 17, wherein said crystallization step comprises a first crystallization stage where said whey concentrate is initially cooled and a second crystallization stage where said whey concentrate is further cooled.

19. The method according to claim 17, wherein the crystallized whey concentrate is dried in a spin flash dryer.

20. The method according to claim 17, wherein a component selected from the group consisting of fats, proteins, carbohydrates, minerals, crystallized whey and mixtures thereof is admixed with said whey concentrate.

21. The method according to claim 20, wherein the component is selected from the group consisting of fats, proteins, carbohydrates, minerals or mixtures thereof.

22. The method according to claim 20, wherein the component is crystallized whey.

* * * * *